2,978,420

CATALYST FOR DEHYDRATION OF SECONDARY ALCOHOLS

William J. G. McCulloch, Plainfield, and Isidor Kirshenbaum, Westfield, N.J., assignors to Esso Research and Engineering Company, a corporation of Delaware No Drawing. Original application Oct. 23, 1956, Ser. No. 617,694, now Patent No. 2,885,442, dated May 5, 1959. Divided and this application Nov. 3, 1958, Ser. No. 771,223

8 Claims. (Cl. 252—443)

This invention relates to a catalyst comprising a metal oxide carried on a special kind of aluminum oxide support, which catalyst is useful in the production of ketones by the dehydrogenation of secondary alcohols. More particularly it relates to a catalyst and the process for its production, which catalyst comprises a zinc oxide-sodium carbonate catalyst deposited on a porous Alundum (alpha alumina) carrier. This is a divisional application of S.N. 617,694 now U.S. Patent No. 2,885,442.

The dehydrogenation of secondary alcohols to ketones is old. In the prior art, various catalysts, such as the near irreducible oxides of Mg, Cr, Mn, and the like, alone or in admixture with other oxides and supports, have been disclosed for such dehydrogenation, as have metals like copper, brass, and zinc. More recently, the most successful commercial method of making methyl ethyl ketone (MEK) has involved dehydrogenation of secondary butanol using 94% ZnO—6% $Na_2CO_3$ coated on lumps of commercial calcined coke. However, in several respects even this catalyst has shown shortcomings. First, the non-uniform particle size of the coke leads to non-uniform heat transfer, resulting in local hot spots, carbonization of the catalyst, and thus shorter catalyst life. Second, the non-porous surface of the coke leads to inferior coating of the ZnO—$Na_2CO_3$ slurry, resulting in powdering of the active catalyst and hence non-uniform activity level and shorter catalyst life.

The use of alumina, or aluminum oxide ($Al_2O_3$), as a catalyst or as a catalyst support is a well-known, highly developed art. Basically three major classifications of alumina are distinguished: The hydrated low temperature forms, the nearly-anhydrous intermediate forms, and anhydrous high temperature forms. The first of these three, alumina hydrates, are commonly found in natural form as gibbsite (hydrargillite), bayerite, bohmite, and diaspore, and in the pure form have been correspondingly assigned names more directly related to their structure: respectively, alpha alumina trihydrate, beta alumina trihydrate, alpha alumina monohydrate, and beta alumina monohydrate. These hydrates have limited catalytic applications as such and are more valuable as starting materials for the production of the aforementioned intermediate forms of alumina.

The intermediate forms include chi, gamma, eta, kappa, delta, and theta aluminas, and they are produced by the controlled calcination of the alpha alumina monohydrate at temperatures in the range of about 480° to 1600° F. The calcination of alpha and beta alumina trihydrate at temperatures between about 280° and 480° F. gives the alpha monohydrate form. These intermediate forms, especially chi, eta, and gamma, as well as alpha monohydrate itself, are principal constituents of catalytically valuable "activated alumina," whose high surface area makes it particularly adaptable for catalytic reactions. Among many catalytic applications, these activated aluminas have been used in catalysts to catalyze certain dehydrogenation reactions such as that of cyclohexane to benzene. However, aluminas suitable for these dehydrogenation reactions have not proved successful in the preparation of ketones by the catalytic dehydrogenation of alcohols, for they invariably have caused extensive dehydration of the molecule as well as the desired dehydrogenation.

Finally, upon further calcination of the intermediate forms of alumina at temperatures generally above 2000° F. but below the melting point of alumina (about 3700° F.), or upon the direct calcination of beta alumina monohydrate at temperatures as low as 800° F., the high temperature forms of alumina, particularly alpha alumina, are obtained. Alpha alumina is distinctive from other aluminas in its unique hexagonal crystal structure, in its non-absorptivity, in its very low surface area, and hence in its low activity. When calcined at temperatures as high as 2000° F. (inherent with its production from all other lower temperature forms except beta alumina monohydrate), alpha alumina has a surface area usually below 1 meter$^2$/gram and not more than 10 m.$^2$/gram. On the other hand, other aluminas previously discussed, and certainly those used for catalytic applications, have surface areas varying between about 75 and 450 m.$^2$/gm. "Alundum" is probably the best known name for alpha alumina, and for purposes of clarity, this word "Alundum" shall be used hereinafter specifically in place of alpha alumina.

Further information regarding the various types of alumina, their properties, and their preparation can be found in Technical Paper No. 10, A. S. Russell, Aluminum Company of America (1953).

The main object of this invention is to provide a catalyst for the dehydrogenation of alcohols to ketones which will give longer catalyst life. Another object of the invention is to improve the above type of dehydrogenation by providing a catalyst having more uniform activity and longer life. A further object of the invention is to provide an alumina-type catalyst which will successfully cause dehydrogenation of alcohols to ketones without appreciable dehydration. Other objects of the invention will become apparent as the details of the invention are disclosed hereinafter.

It has now been discovered that Alundum, unlike other previously used aluminas, can be used successfully as a carrier for dehydrogenation catalyst such as ZnO—$Na_2CO_3$ in the dehydrogenation of an alcohol to a ketone. Actually, for the purposes of this invention, the surface area of the Alundum should be at least below 10 m.$^2$/gm., preferably below 5 m.$^2$/gm., and most desirably below 1 m.$^2$/gm. The Alundum prepared by the lower temperature calcination of beta alumina monohydrate has a greater area and must be further heated to temperatures above about 2000° F. Because of the properties of Alundum mentioned above, especially its nonabsorptiveness and low surface area, successful use of such alumina as a catalyst support was highly unexpected. At the same time, such use of Alundum was found to avoid the aforementioned disadvantages that characterized the previously used catalyst carried on a coke support.

The catalyst of the present invention is prepared by first water-washing a commercial grade Alundum, such as tabular-Alundum, then intimately mixing $Na_2CO_3$ powder with a commercial grade of powdered ZnO and slurrying with water, and finally blending with the Alundum pellets in a mixer. The coated catalyst is then dried for about 24 hours at a temperature in the range of 250° to 450° F., a second coat of ZnO—$Na_2CO_3$ is added by the same procedure, and the mixture is dried accordingly. The resulting finished catalyst contains 5 to 25% of a mixture comprising 90 to 98% ZnO and correspondingly 10 to 2% $Na_2CO_3$. The preferred ranges are 10 to 20% of the mixture comprising 92 to 96% ZnO and 8 to 4%

$Na_2CO_3$. Such preferred ratios necessarily require mixing approximately 9.2 to 9.6 parts of ZnO and 0.8 to 0.4 part of $Na_2CO_3$ in each blending step with a total of about 100 to 200 parts of Alundum. About 5 to 10, usually about 8, parts of $H_2O$ are used in each blending step. The catalyst is preferably heated to reaction temperatures prior to use as a dehydrogenation catalyst in this invention.

The dehydrogenation of secondary alcohols is effected in the presence of the above-described catalyst at temperatures in the range of 600° to 950° F., preferably 700° to 850° F. The reaction is usually carried out at atmospheric pressure, although a range from about 0.5 to 10 atmospheres is feasible. Instead of operating at vacuum pressures, a similar effect may be obtained by diluting the reagents with inert gases such as nitrogen or light refinery gases, e.g. $CH_4$ and the like. The volumetric alcohol feed rate for the invention may vary between 0.75 and 5.0 volumes of liquid alcohol per volume of catalyst per hour, preferably 1.5 to 3.0 v./v./hr. When the reaction exists at the preferred conditions of temperature, pressure and feed rate, an alcohol conversion usually greater than 90% is achieved, together with a product selectivity to MEK in excess of 95%, and a selectivity to $H_2O$ less than 1%. This low selectivity to $H_2O$ indicates that dehydration is negligible, a surprising finding when it is considered that conventional activated alumina could not be used because of its tendency to cause excessive dehydration of the alcohol. At the same time the uniformity in size and the porosity of structure of the new catalyst allows it to overcome the two disadvantages of the coke support: Namely, non-uniform heat transfer and powdering of the coke-supported $ZnO$—$Na_2CO_3$ catalyst. The elimination of these two disadvantages is evidenced by the fact that when the catalyst of the present invention is removed from the reactor there is no crushed material present, whereas when the coke-supported catalyst is removed there is a large portion in powdered form.

To further emphasize the nature and advantages of the present invention, the following specific example is set forth. However, it should be understood that the invention is not limited to the example. Unless otherwise stated, all ratios and percentages are given throughout on a weight basis.

Example

Secondary butanol was dehydrated at high temperatures to produce MEK, first using the standard $ZnO$—$Na_2CO_3$ on calcined coke, secondly using the same catalyst on a conventional activated alumina (eta alumina), and thirdly using $ZnO$—$Na_2CO_3$ on tabular Alundum which was formed as pebbles 0.10 to 0.20 inch in size by calcining alpha alumina monohydrate at temperatures of about 2200° F. A mixture of 9.4 parts of ZnO and 0.6 part of $Na_2CO_3$ were mixed in a slurry with 8 parts of water, then mixed with 150 parts of the Alundum, and dried at a temperature of 350° F. Another coat of 9.4 parts ZnO, 0.6 part $Na_2CO_3$, and 8 parts $H_2O$ was then added by the same procedure and the mixture was redried at 350° F. for use in the synthesis. The following data were obtained:

| Run | Catalyst | Av. Temp., °F. | V./v./hr | Conversion | Selectivity, wt. Percent | |
|---|---|---|---|---|---|---|
| | | | | | MEK | $H_2O$ |
| 1 | Standard 94% ZnO—6% $Na_2CO_3$ on coke. | 745 | 1.67 | 87–88 | 98–99 | 0.2–0.6 |
| 2 | 94% ZnO—6% $Na_2CO_3$ on eta alumina. | 500 | 1.50 | 18 | ------ | 5.1 |
| 3 | 94% ZnO—6% $Na_2CO_3$ on tabular Alundum. | 775 | 1.59 | 96–7 | 97 | 0.6 |

It is to be noted that the results shown above are similar for runs 1 and 3 using the coke and the Alundum supports, except the new catalyst used in run 3 exhibits better activity. This superiority is definitely greater in magnitude than could be attributed to the slightly higher temperature used in run 3. In addition the two catalysts are comparable as to selectivity to MEK and $H_2O$. However, the decisive superiority of the Alundum supported catalyst over the coke supported catalyst became strikingly apparent upon conclusion of the runs when the catalyst, in each case, was removed from the reactor. In the case of the support of the present invention, the catalyst was removed in the same uniform size and shape which it possessed when it was charged to the reactor, whereas the coke-supported catalyst when removed contained a substantial fraction in the form of fines, or powder. Thus the new catalyst could be recharged for further reaction while a substantial portion of the old catalyst required replacement.

The catalyst of run 2 gave completely unsatisfactory results. The conditions of temperature and volumetric feed rate were kept low intentionally to prevent excessive dehydration, thus a very low conversion to MEK was caused. However, even at this low temperature and conversion the selectivity to $H_2O$ is still very much greater than that when the new catalyst combination of run 3 is used. Hence, run 2 confirms the well-known fact that the use of conventional activated aluminas for catalyst supports is obviously impractical for such alcohol dehydrogenation reactions.

The example refers to the production of MEK from secondary butanol. However, the advantages of this invention may be similarly applied to the dehydrogenation of other secondary alcohols to produce other ketones. Typical similar examples would be the production of acetone from isopropanol, propyl butyl ketone from 4-octanol, or broadly, the preparation of $C_3$ to $C_8$ or even higher carbon containing ketones from the corresponding secondary alcohols. The example also refers to the use of a $ZnO$—$Na_2CO_3$ catalyst, but the advantages of the novel Alundum support can be utilized similarly with other metal oxides known for their activity as dehydrogenation catalysts such as those of Ce, Mg, Mn, Cr, Be, Fe, etc.

Having thus described the nature of the invention, the true scope is particularly pointed out in the appended claims.

What is claimed is:

1. A composite catalyst comprising a mixture of 90 to 98 parts by weight of ZnO and correspondingly, 10 to 2 parts by weight of $Na_2CO_3$, said mixture being deposited on alpha alumina of surface area less than 10 meters$^2$/gram in a ratio of 5 to 25 weight percent based on the total composite catalyst.

2. The composite catalyst of claim 1 wherein the active catalyst mixture comprises 92 to 96 parts by weight of ZnO and 8 to 4 parts by weight of $Na_2CO_3$, and wherein said mixture is deposited on the alpha alumina in a ratio between 10 and 20 weight percent.

3. A composite catalyst comprising a mixture of 90 to 98 parts by weight of ZnO and correspondingly, 10 to 2 parts by weight of $Na_2CO_3$, said mixture being deposited on alpha alumina of surface area less than 5 meters$^2$/gram in a ratio of 5 to 25 weight percent based on the total composite catalyst.

4. The composite catalyst of claim 3 wherein the active catalyst mixture comprises 92 to 96 parts by weight of ZnO and 8 to 4 parts by weight of $Na_2CO_3$, and wherein said mixture is deposited on the alpha alumina in a ratio between 10 and 20 weight percent.

5. A composite catalyst comprising a mixture of 90 to 98 parts by weight of ZnO and correspondingly, 10 to 2 parts by weight of $Na_2CO_3$, said mixture being deposited on alpha alumina of surface area less than 1 meter$^2$/gram in a ratio of 5 to 25 weight percent based on the total composite catalyst.

6. The composite catalyst of claim 5 wherein the active catalyst mixture comprises 92 to 96 parts by weight of ZnO and 8 to 4 parts by weight of $Na_2CO_3$, and wherein said mixture is deposited on the alpha alumina in a ratio between 10 and 20 weight percent.

7. A process for making a composite dehydrogenation catalyst which comprises impregnating Alundum granules of surface area less than 5 meters$^2$/gram with 10 to 25 weight percent based on the total composite catalyst of a slurry of 90 to 98 parts by weight of ZnO and 10 to 2 parts by weight of $Na_2CO_3$.

8. A process for making a dehydrogenation catalyst which comprises calcining aluminum oxide at temperatures above about 2000° F. and below the melting point of said aluminum oxide; mixing a slurry of 92 to 96 parts by weight of ZnO, 8 to 4 parts by weight of $Na_2CO_3$, and 50 to 100 parts by weight of $H_2O$ with 1000 to 2000 parts by weight of the alpha alumina of surface area less than 1 meter$^2$/gram resulting from said calcination; drying said mixture at a temperature between 250° and 450° F.; mixing a second slurry of 92 to 96 parts by weight of ZnO, 8 to 4 parts by weight of $Na_2CO_3$, and 50 to 100 parts by weight of $H_2O$ with said dried mixture; and drying the new mixture at a temperature between 250° and 450° F.

References Cited in the file of this patent
UNITED STATES PATENTS

| | | |
|---|---|---|
| 1,895,528 | Taylor et al. | Jan. 31, 1933 |
| 2,331,292 | Archibald et al. | Oct. 12, 1943 |
| 2,472,493 | Schneider et al. | June 7, 1949 |
| 2,480,520 | Thacker | Aug. 30, 1949 |
| 2,504,497 | Charles et al. | Apr. 18, 1950 |
| 2,633,475 | Mottern | Mar. 31, 1953 |
| 2,794,053 | Altreuter et al. | May 28, 1957 |
| 2,800,518 | Pitzer | July 23, 1957 |